(12) United States Patent  
Burek et al.

(10) Patent No.: US 8,143,521 B2
(45) Date of Patent: Mar. 27, 2012

(54) VERTICAL CABLE PROTECTION AND MANAGEMENT TROUGH

(75) Inventors: Denis E. Burek, Cumming, GA (US); Willard C. White, III, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 235 days.

(21) Appl. No.: 12/658,461

(22) Filed: Feb. 11, 2010

(65) Prior Publication Data

US 2011/0192631 A1    Aug. 11, 2011

(51) Int. Cl.
*H02G 3/04* (2006.01)
(52) U.S. Cl. ......... 174/100; 174/99 R; 174/97; 439/713; 385/135; 211/26
(58) Field of Classification Search ................ 174/99 R, 174/100–101, 97, 50; 248/49, 68.1; 439/713; 385/135; 211/26
See application file for complete search history.

(56) References Cited

U.S. PATENT DOCUMENTS

| | | | |
|---|---|---|---|
| 6,011,221 A * | 1/2000 | Lecinski et al. | ............ 174/72 A |
| 6,541,705 B1 | 4/2003 | McGrath | |
| 6,571,047 B1 | 5/2003 | Yarkosky et al. | |
| 6,845,206 B2 | 1/2005 | Dwyer et al. | |
| 7,417,188 B2 * | 8/2008 | McNutt et al. | ............... 174/68.1 |
| 7,437,048 B2 | 10/2008 | Farrell et al. | |

OTHER PUBLICATIONS

Cisco Systems, Cisco XR 12416 and XR 12816 Router Chassis Installation Guide (Mar. 2009), pp. 1-1 to 1-3 and 3-23 to 3-24.
ADC Telecommunications, Unequal Flange Rack Installation Guide (Feb. 2001), pp. 1-2 and 30-36.

* cited by examiner

*Primary Examiner* — Dhirubhai R Patel
(74) *Attorney, Agent, or Firm* — Law Office of Leo Zucker

(57) ABSTRACT

A cable trough and system for routing and managing cables associated with equipment that has first cable ports at a first side of the equipment and second cable ports at a second side of the equipment. The trough includes an elongated trough body having a ported side wall constructed to mount at either one of the first and the second sides of the equipment. The ported side wall of the body has one or more first trough cable ports each located and dimensioned to align or interface with a different one of the first equipment cable ports when the ported side wall is mounted at the first side of the equipment, and one or more second trough cable ports each located and dimensioned to align with a different one of the second equipment cable ports when the ported side wall is mounted at the second side of the equipment.

18 Claims, 7 Drawing Sheets

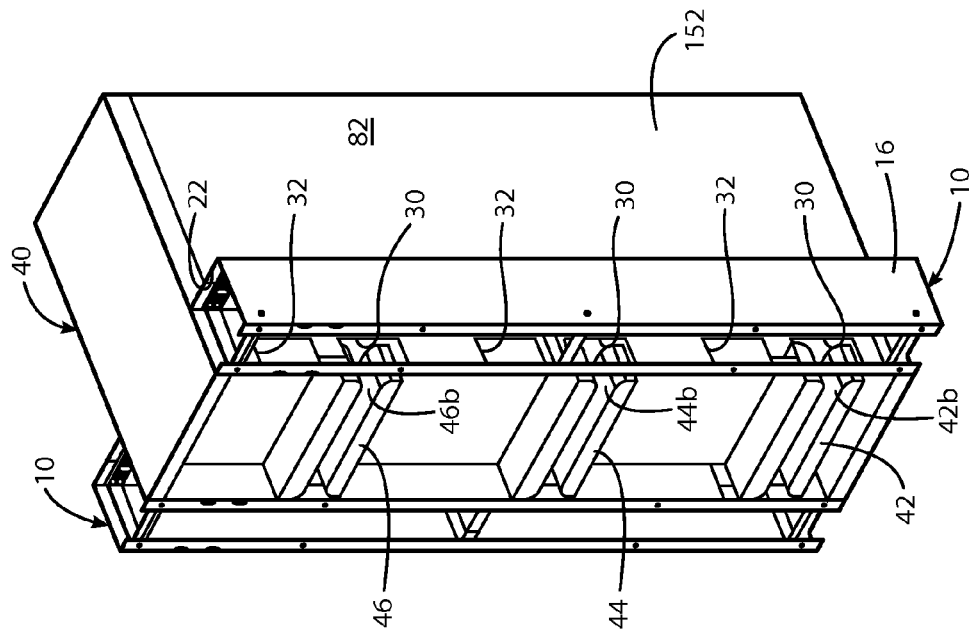
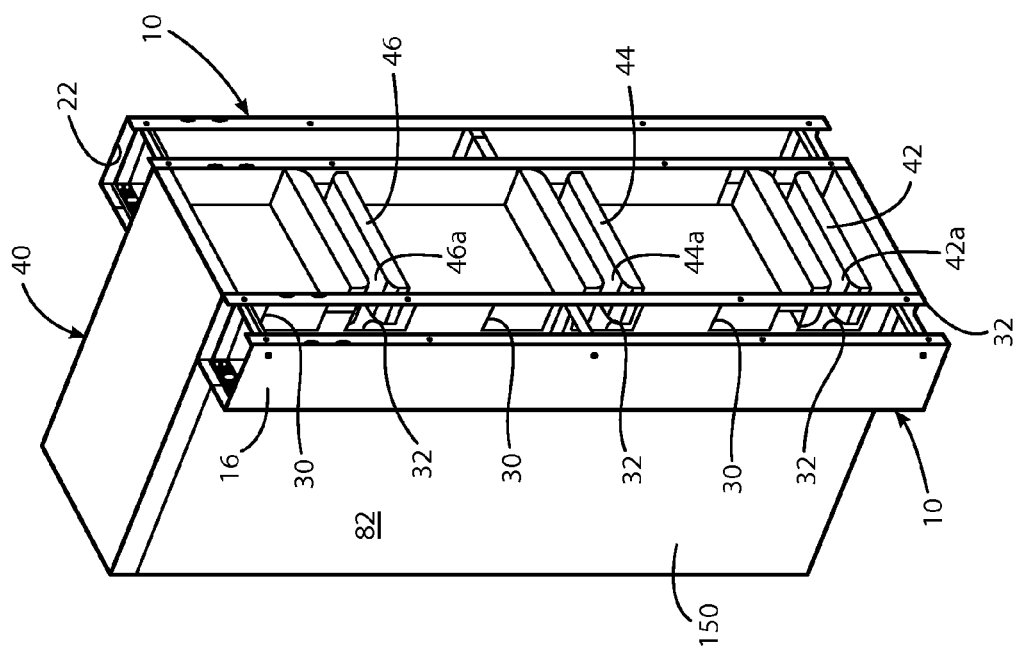

VERTICAL CABLE PROTECTION AND MANAGEMENT TROUGH

BACKGROUND OF THE INVENTION

1. Field of the Invention

The present invention concerns apparatus for protectively enclosing network or communications cables in proximity to equipment where the cables are terminated.

2. Discussion of the Known Art

It is common practice at central switching offices to contain fiber optic and wire cables in protective troughs suspended horizontally above a number of routers or other equipment where the cables terminate. Cables associated with a given piece of equipment are allowed to drop a certain distance in an exposed state from the trough above the equipment, and to enter cable ports of the equipment. Thus, if a new cable must be connected to equipment in addition to existing connected cables, it is not uncommon to lash the new cable to the existing cables where exposed so as to provide the new cable with ample support. It will be appreciated, however, that such lashing can disturb the orientation of the existing cables and increase signal attenuation within the cables, especially if the cables are disturbed near their associated equipment ports.

It is known generally to attach a so-called vertical cable management trough to either side of a router to contain cables that run next to the router. See, Cisco Systems, Inc., Model XR 12416 and XR 12816 Router Chassis Installation Guide (March 2009), at pages 3-23 and 3-24. So-called inter-bay fiber management assemblies are also known that are constructed to contain and manage the routing of fiber optic cable at different levels or bays of an equipment rack, or the bays of two adjacent equipment racks. See U.S. Pat. No. 6,541,705 (Apr. 1, 2003), No. 6,571,047 (May 27, 2003), No. 6,845,206 (Jan. 18, 2005), and No. 7,437,048 (Oct. 14, 2008). See also, ADC Telecommunications, Inc., Unequal Flange Rack Installation Instructions (February 2001), at pages 31-34.

Notwithstanding the known art, there is a need for a cable trough such that, when mounted adjacent to either side of a given piece of equipment, cables contained inside the trough will be protected and will maintain a desired orientation and interface with the equipment cable ports. There is also a need for a cable trough that can be mounted vertically along either one of two different sides of equipment, even though the cable ports at the sides of the equipment are not configured symmetrically over the height of the equipment.

SUMMARY OF THE INVENTION

According to the invention, a cable trough for routing and managing cables associated with equipment that has first equipment cable ports at a first side of the equipment and second equipment cable ports at a second side of the equipment, includes an elongated trough body having a ported side wall constructed and arranged to mount at either one of the first and the second sides of the equipment. The ported side wall of the trough body has one or more first trough cable ports each located and dimensioned to align with a different one of the first equipment cable ports when the ported side of the trough body is mounted at the first side of the equipment, and one or more second trough cable ports each located and dimensioned to align with a different one of the second equipment cable ports when the ported side wall of the trough body is mounted at the second side of the equipment.

For a better understanding of the invention, reference is made to the following description taken in conjunction with the accompanying drawing and the appended claims.

BRIEF DESCRIPTION OF THE DRAWING

In the drawing:

FIGS. 4 and 5 each show a pair of the inventive troughs mounted at the left and the right sides of equipment to communicate with cable ports at both sides of the equipment;

DETAILED DESCRIPTION OF THE INVENTION

Figure 1:
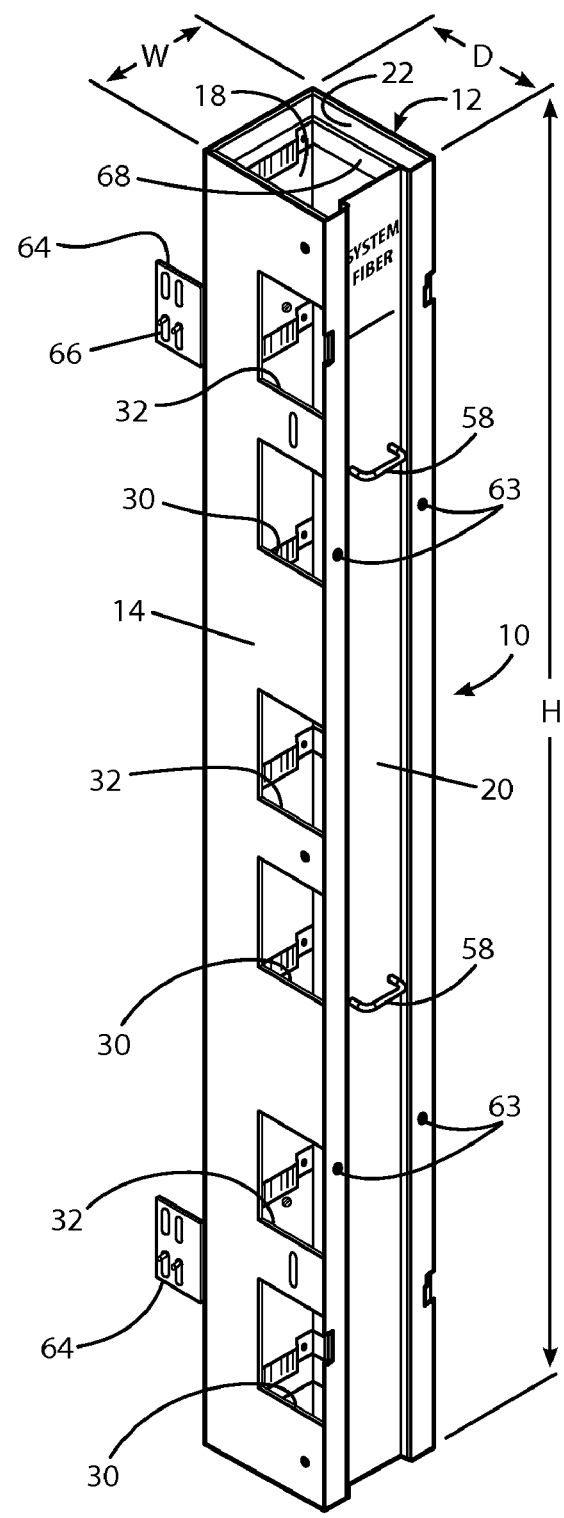
FIG. 1 is a perspective view of an assembled cable protection trough according to the invention, wherein the trough is oriented vertically to communicate with cable ports that open at a side of associated equipment.

FIG. 1 is a perspective view of an assembled cable protection trough 10 according to the invention. In FIG. 1, the trough 10 is oriented so that cables contained in the trough can be routed to a selected one of a number of vertically spaced side cable ports of associated equipment when the trough is mounted at the ported side of the equipment (see FIGS. 4 to 6). In the illustrated embodiment, the trough 10 is constructed and arranged for mounting vertically at either a left or a right side of full rack sized equipment such as, e.g., a Cisco Systems model XR 12416 or XR 12816 router. In such a case, the trough 10 may have a height H of 83 inches, a width W of 8.00 inches, and a depth D of 9.10 inches. It will be understood, however, that the inventive trough 10 may be dimensioned and constructed for use with equipment of various heights and cable port configurations at one or more sides of the equipment.

Figure 2:
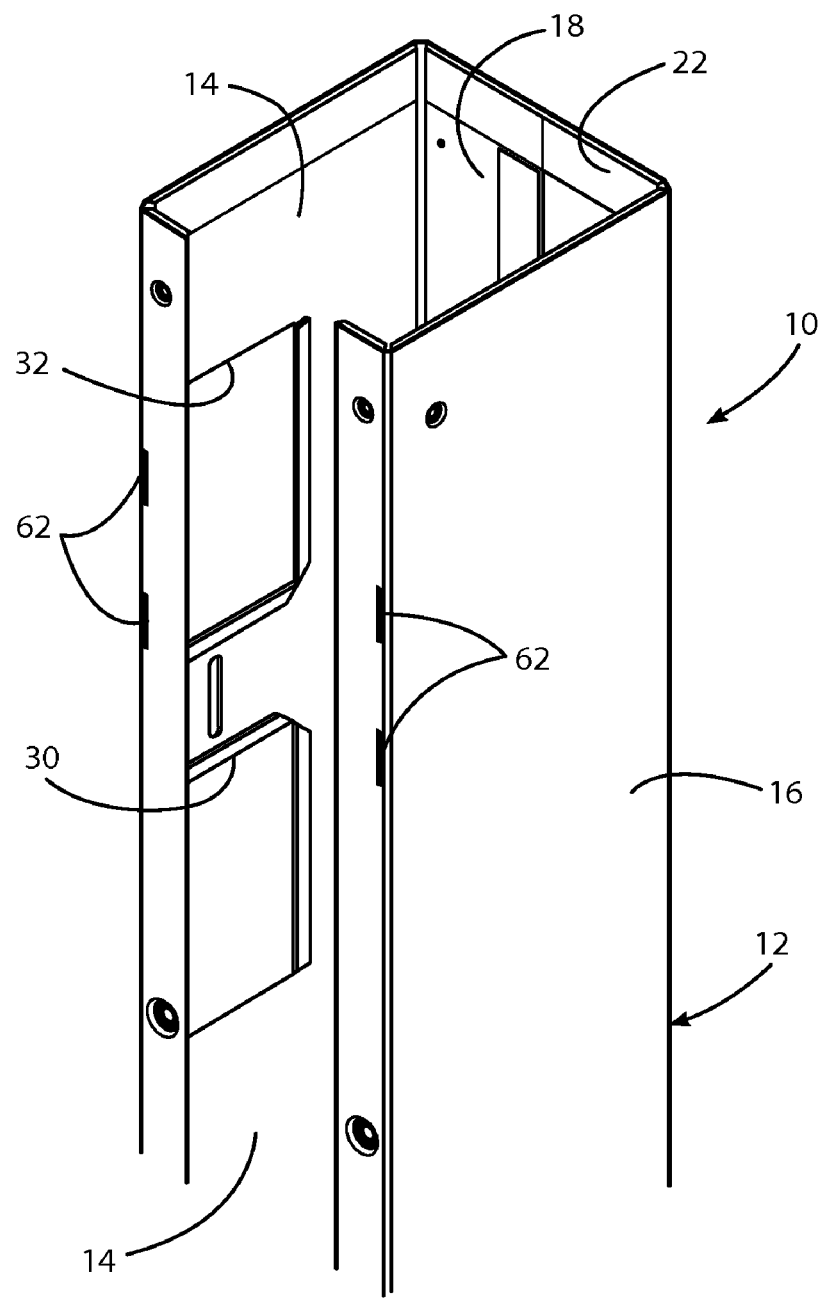
FIG. 2 is an enlarged perspective view of an upper portion of the inventive trough as seen from the right in FIG. 1 when a front door is removed.

The trough 10 includes an elongated hollow trough body 12 having a generally U-shaped cross section for containing, protecting and managing cables associated with the equipment with which the trough is used. The trough body 12 has a ported side wall 14, closed side and back walls 16, 18, and a front door 20 opposite the back wall 18. The door may be mounted to the trough body 12 using removable door catches and screws as shown in the drawing and explained later below, or the door may be hinged to the trough body 12 in a conventional manner along one long side of the door. When the front door 20 is opened or removed, cables that originate from an overhead trough or elsewhere and which terminate at the equipment, can be inserted in the trough 10 and pass through a top open end 22 of the trough. It is preferred that the edges of the trough walls in the region of the open end 22 be hemmed, grommeted, or otherwise smoothed as shown in FIG. 2 to avoid cable chafing or cutting. Depending only on the kind of equipment with which the trough is used, optical fiber, electrical wire, or both kinds of cable can be managed by the trough 10.

The ported side wall 14 of the trough 10 has one or more first trough cable ports 30 each located and dimensioned to interface or align with a different one of a number of first equipment cable ports when the side wall 14 is mounted at a first side of the equipment. The ported side wall 14 also has one or more second trough cable ports 32 each located and dimensioned to interface or align with a different one of a number of second equipment cable ports when the side wall 14 is mounted at a second side of the equipment. It is preferred that edges of the trough cable ports 30, 32 also be hemmed, grommeted, or otherwise smoothed as shown in FIG. 2 to avoid cable chafing or cutting in the region of the cable ports 30, 32.

Figure 10:
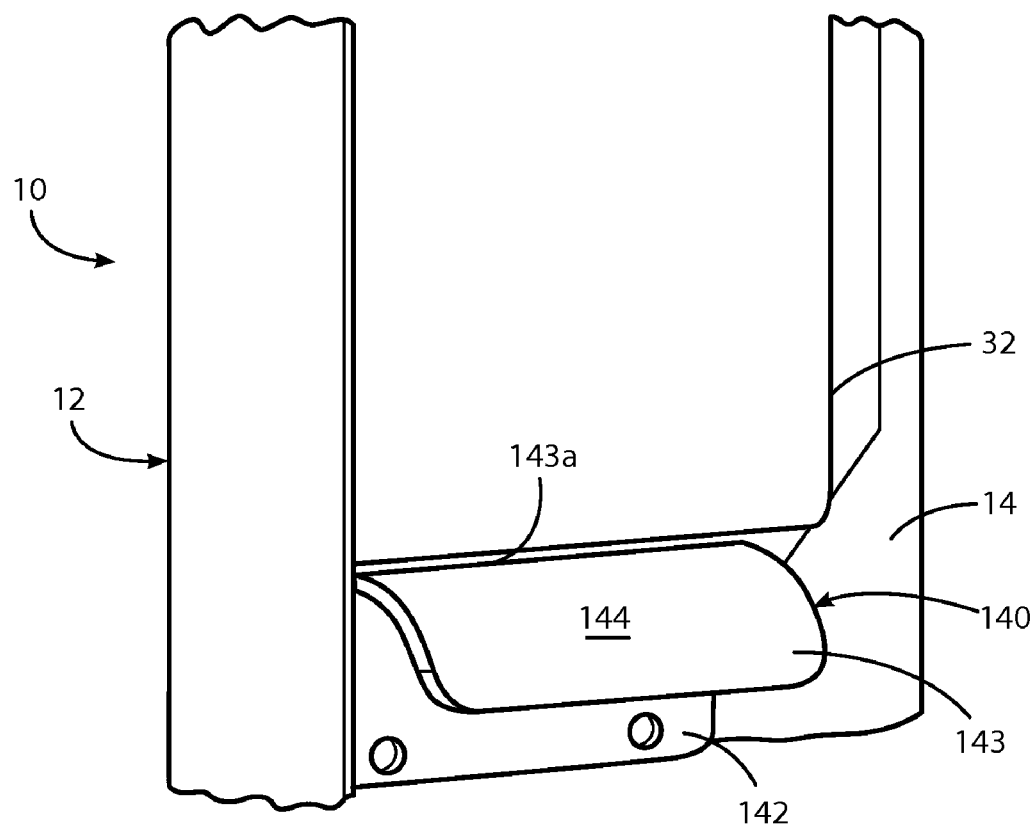
FIG. 10 shows a cable bend limiter fastened inside the trough next to a cable port.
Figure 11:
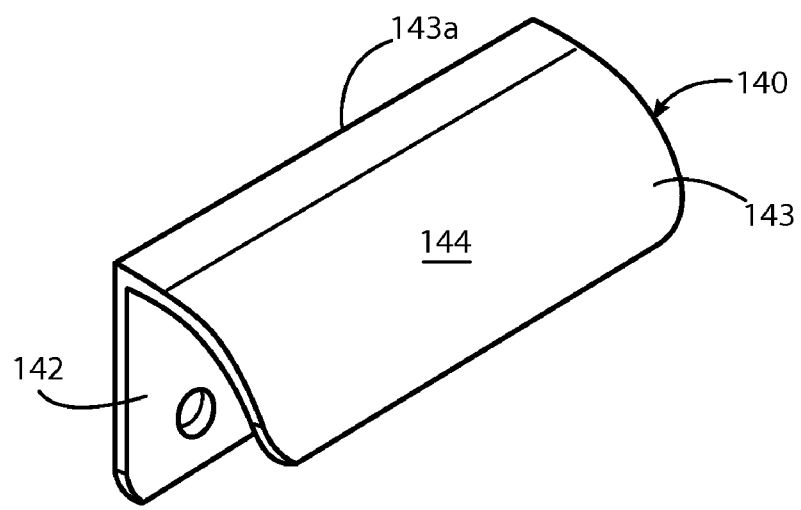
FIG. 11 is a perspective view of the cable bend limiter in FIG. 10.

To ensure that a specified minimum bend radius is preserved for certain fiber optic cables that pass through the cable ports 30, 32, one or more cable bend limiters 140 may be fixed to the ported side wall 14 of the trough body 12 next to corresponding ones of the ports, as shown in FIG. 10. Each bend limiter 140 includes a flat mounting flange 142, and a cable guide lip 143 that projects outwardly of the flange 142. The guide lip 143 has an upper surface 144 with a radius of curvature that exceeds the specified minimum cable bend radius by a safe margin. See FIG. 11. Each bend limiter 140 is preferably fixed to the ported side wall 14 from inside the trough 10 using screws or other conventional fastening means, so that a top edge 143a of the guide lip is closely aligned with an edge of the corresponding port.

Figure 3:
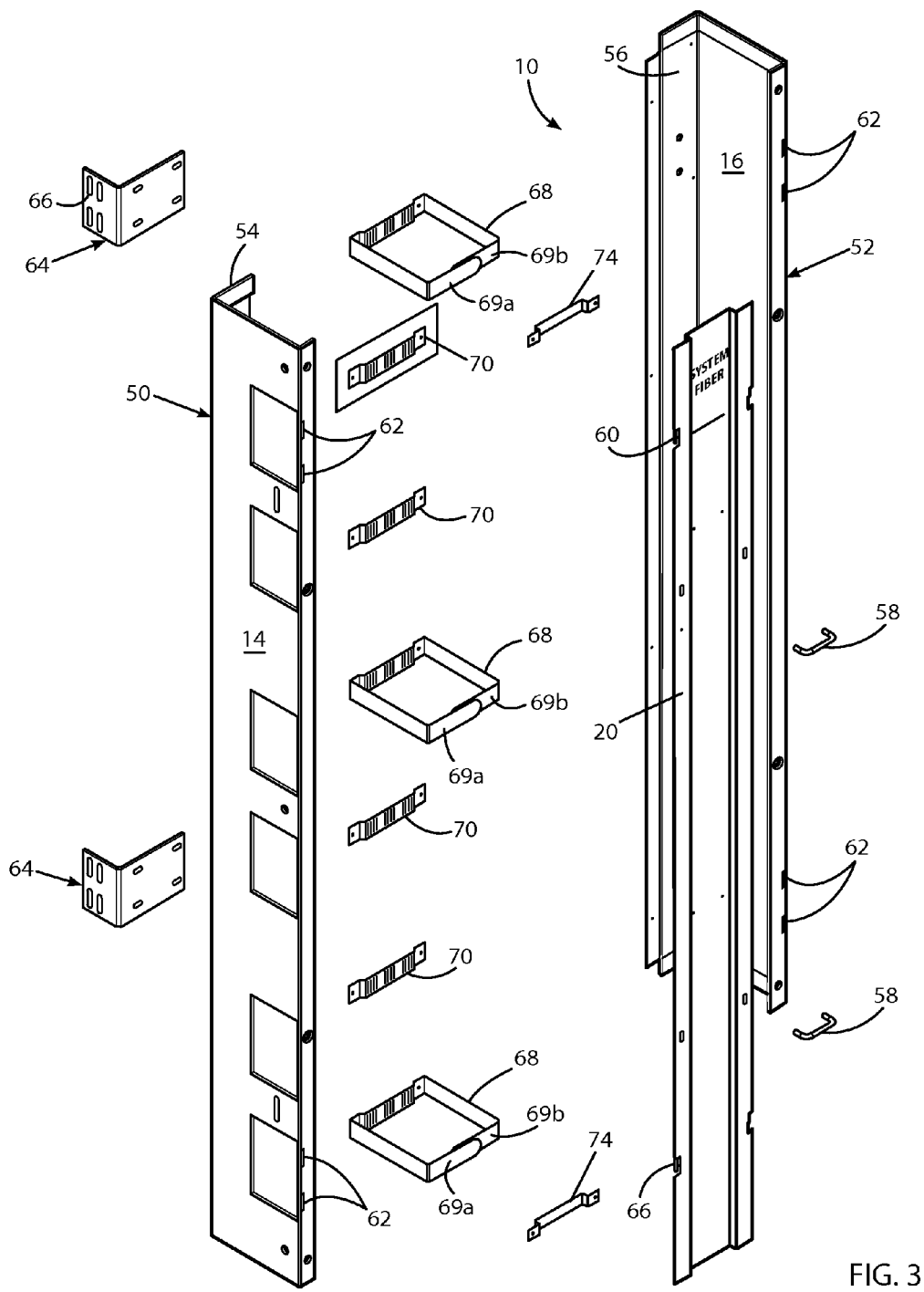
FIG. 3 is an exploded assembly view of the trough in FIG. 1.

FIG. 3 is an exploded assembly view of the trough in FIG. 1, and illustrates a currently preferred trough construction wherein the trough 10 is assembled from an elongated port half 50 having a generally L-shaped cross section, and an elongated solid half 52 also of generally L-shaped cross-section. The port half 50 and the solid half 52 may be formed, for example, from 0.090 inch thick cold rolled steel (CRS). As seen in FIG. 3, the wide wall of the port half 50 forms the ported side wall 14 of the trough 10, and the wide wall of the solid half 52 forms the closed side wall 16 of the trough. The narrow walls 54, 56 of the two halves 50, 52 together form the closed back wall 18 of the trough 10 in FIG. 1 when the halves 50, 52 are spot welded or otherwise joined to one another in a conventional manner.

The trough door 20 may also be formed, e.g., from 0.090 inch-thick CRS, and a pair of door handles 58 are preferably fastened to the door 20 as shown in FIGS. 1 and 3. Door catches 60 are formed along each long side of the door 20 near the top and the bottom of the door, to engage corresponding slots 62 that are cut into flanges at the front of the two trough halves 50, 52. In the illustrated embodiment, the door 20 is secured in a closed position by way of captive door screws 63 (see FIG. 1) or equivalent fasteners that engage the front flanges of the trough halves 50, 52 along each side of the door 20. As mentioned earlier, the door may instead be hinged along one side to one of the trough halves 50, 52.

Figure 6:
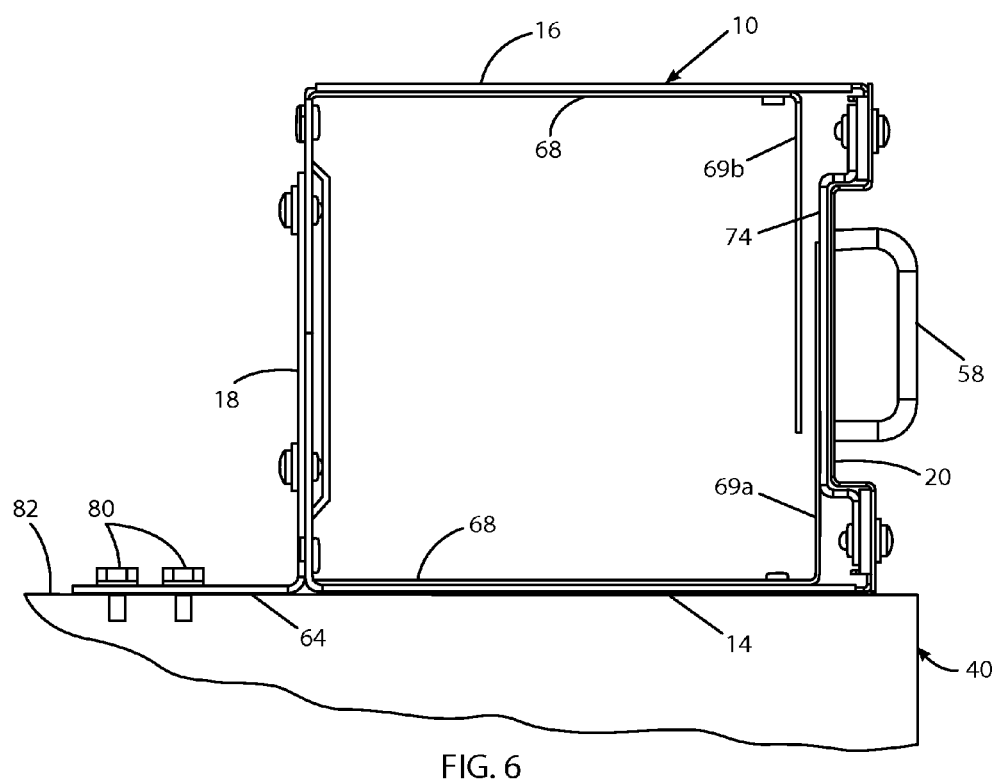
FIG. 6 is an enlarged top view of the trough as mounted on the right side of the equipment in FIGS. 4 and 5.

After the port and the solid halves 50, 52 of the trough 10 are joined, one leg of a generally L-shaped mounting bracket 64 is fastened to the back wall 18 of the trough near the top of the trough, and another bracket 64 has one leg fastened to the back wall 18 near the bottom of the trough, as shown in FIGS. 1, 3 and 6. The remaining leg of each bracket 64 extends substantially flush with the ported side wall 14 of the trough, and has slotted openings 66 through which screws 80 (FIG. 6) or other fasteners are inserted to mount the trough 10 against a cabinet wall 82 or other structure at the side of the equipment.

Figure 8:
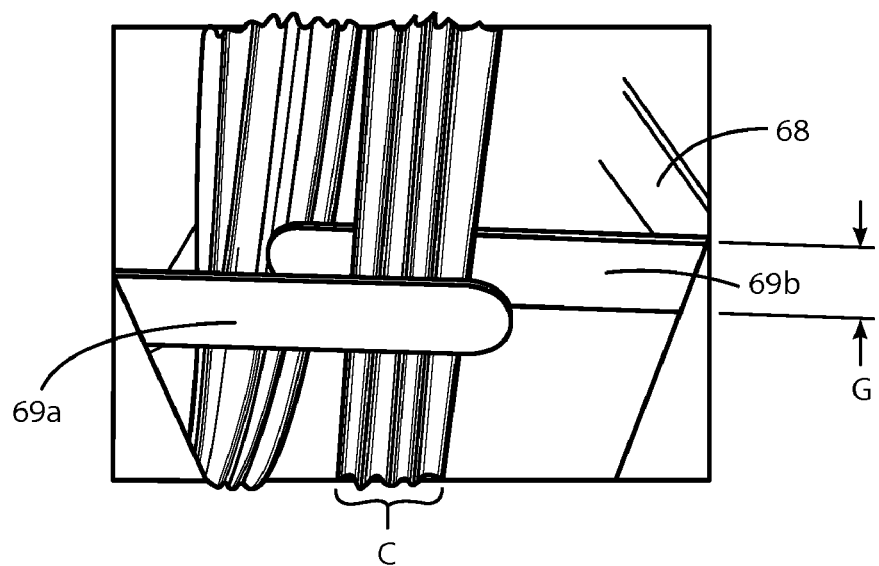
FIG. 8 shows several cables being inserted into the trough through a retention bracket.

A number of cable retention brackets 68 are fastened along the back wall 18 and the side walls 14, 16 inside of the trough 10. As seen in FIG. 8, each retention bracket 68 has a pair of overlapping spring fingers 69a, 69b that allow cables C to be inserted in the trough when the door 20 is removed. Specifically, the cables C are urged against the finger 69b and pass into the trough through a gap G between the fingers 69a, 69b. The cables C are retained inside the trough 10 when the finger 69b springs back toward the finger 69a to close the gap G.

Figure 7:
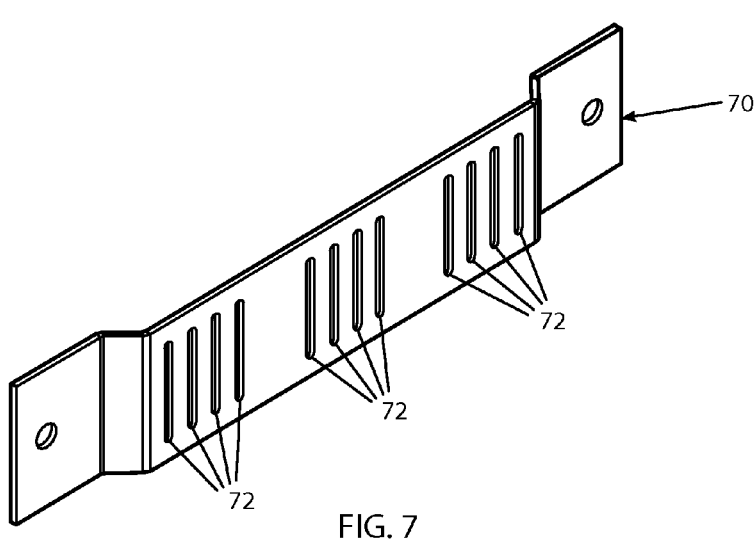
FIG. 7 is an enlarged perspective view of one of a number of cable tie down brackets that are fixed inside the trough.
Figure 9:
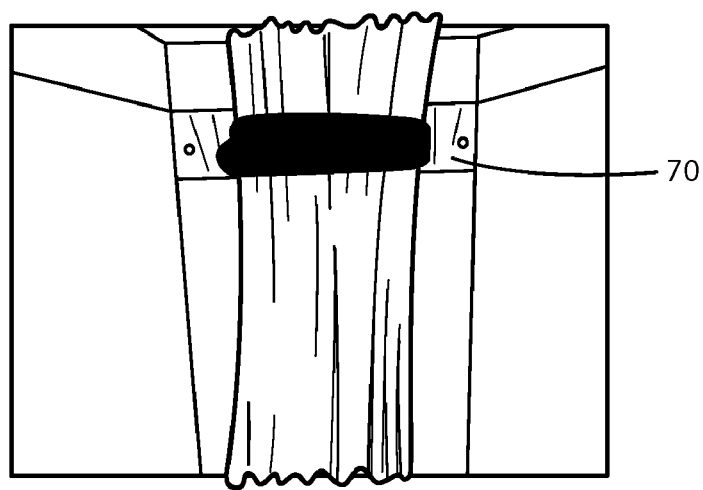
FIG. 9 shows a number of cables secured in position at a tie down bracket inside the trough.

A number of cable tie down brackets 70, one of which is shown in detail in FIG. 7, are also fastened along the back wall 18 inside the trough 10. As shown in FIG. 9, each bracket 70 is provided with one or more Velcro® or other flexible straps that are laced through slots 72 in the bracket, and free ends of the straps are used to tie down and secure cables in a desired position against each bracket 70 inside the trough. In addition to the cable tie down brackets 70, the base of each cable retention bracket 68 may also have associated Velcro® or other flexible straps for tying down and securing cables to each of the brackets 68 inside the trough.

After the cable retention and the tie down brackets 68, 70 are installed and for increased structural integrity, a pair of cross brackets 74 are each fastened between the front flanges of the trough halves 50, 52 at the top and the bottom of the trough 10. See FIGS. 3 and 6.

FIGS. 4 and 5 show a pair of the inventive troughs 10 mounted at the left and the right sides 150, 152 of certain equipment. In the illustrated embodiment, the equipment is a router 40 having a lower cable management bracket 42, a middle cable management bracket 44, and an upper cable management bracket 46. The brackets 42, 44 and 46 receive and manage cables that terminate with circuit boards or other fiber or electrical components mounted inside the router 40 in the vicinity of the brackets. The lower bracket 42 forms a left side router cable port 42a and a right side router cable port 42b. The middle bracket 44 defines a left side router cable port 44a and a right side router cable port 44b. The upper bracket 46 forms a left side router cable port 46a and a right side router cable port 46b. Note also that the vertical distance between the bottom of the router 40 and the lower equipment cable ports 42a, 42b, is less than the distance between the top of the router and the upper equipment cable ports 46a, 46b. That is, the cable ports at either side of the router 40 are not configured symmetrically over the height of the router.

The trough 10 is constructed and arranged so that when mounted on either the left side 150 or the right side 152 of the router 40, each of the router cable ports on the side of the router will align or interface with a corresponding trough cable port. Specifically, when the trough 10 is mounted on the right side 152 of the router 40 as shown in FIG. 5, each one of the first trough cable ports 30 is located and dimensioned in the ported side wall 14 of the trough so as to align with a different one of the right side router cable ports 42b, 44b and 46b. When the vertical orientation of the trough 10 at the right side 152 of the router of 40 is inverted, and the trough is mounted on the left side 150 of the router as shown in FIG. 4, each one of the second trough cable ports 32 is located and dimensioned in the ported side wall 14 of the trough so as to align with a different one of the left side router cable ports 42a, 44a and 46a.

Accordingly, as seen at the left in FIG. 4, the first trough cable ports 30 do not align with the cable ports 42a, 44a, 46a of the router 40, and the ports 30 are closed by a solid region of the router cabinet instead. Thus, when the trough 10 is mounted at the left side 150 of the router 40 as in FIG. 4, cables contained in the trough 10 will remain protected except at the trough cable ports 32 through which the cables may pass safely into selected ones of the router cable ports 42a, 44a, 46a.

Likewise, as seen at the right in FIG. 5, the second cable ports 32 do not align with the cable ports to 42b, 44b, 46b of the router 40, and the ports 32 are instead closed by a solid region of the router cabinet. Therefore, when the trough 10 is mounted at the right side 152 of the router 40 as in FIG. 5, cables inside the trough 10 will remain protected except at the trough cable ports 30 through which the cables may pass safely into selected ones of the router cable ports 42b, 44b, 46b.

While the foregoing represents a preferred embodiment of the invention, it will be understood by persons skilled in the art that various modifications and changes can be made without departing from the spirit and scope of the invention, and that the present invention includes all such modifications and changes as come within the scope of the following claims.

We claim:

1. A cable trough for protecting and managing cables associated with equipment that has first equipment cable ports that open on a first side of the equipment and second equipment cable ports that open on a second side of the equipment, the trough comprising:
    an elongated trough body having a ported side wall constructed and arranged to mount on either one of the first and the second sides of the equipment; and
    the ported side wall of the trough body has one or more first trough cable ports each of which is located and dimensioned to align with a corresponding one of the first equipment cable ports when the ported side wall of the trough body is mounted on the first side of the equipment, and one or more second trough cable ports each of which is located and dimensioned to align with a corresponding one of the second equipment cable ports when the ported side wall of the trough body is mounted on the second side of the equipment.

2. A cable trough according to claim 1, wherein the trough body includes a closed side wall opposite the ported side wall, and a back wall extending between the ported and the closed side walls.

3. A cable trough according to claim 2, including a front door that is either mounted or hinged to the trough body opposite the back wall.

4. A cable trough according to claim 1, including one or more cable retention brackets fastened inside the trough body for retaining cables inserted in the trough.

5. A cable trough according to claim 1, including one or more cable tie down brackets fastened inside the trough body for securing cables inserted in the trough in a desired position.

6. A cable trough according to claim 5, wherein one of the tie down brackets has one or more straps for tying down the inserted cables to the bracket inside the trough.

7. A cable trough according to claim 1, including one or more mounting brackets fixed to the trough body for mounting the trough next to the equipment.

8. A cable trough according to claim 7, wherein the mounting brackets are formed and arranged to mount the trough on a side wall of the equipment.

9. A cable trough according to claim 8, wherein the equipment is a router.

10. A system for protecting and managing cables that terminate at a router having first router cable ports that open on a first side of the router and second cable ports that open on a second side of the router, the system comprising:
    a first cable trough mounted on the first side of the router for containing cables that enter the first router cable ports;
    a second cable trough mounted on the second side of the router for containing cables that enter the second router cable ports;
    wherein each of the first and the second cable troughs comprises;
    an elongated trough body having a ported side wall constructed and arranged to mount on either one of the first and the second sides of the router; and
    the ported side wall of the trough body has one or more first trough cable ports each of which is located and dimensioned to align with a corresponding one of the first router cable ports when the ported side wall of the trough body is mounted on the first side of the router, and one or more second trough cable ports each of which is located and dimensioned to align with a corresponding one of the second router cable ports when the ported side wall of the trough body is mounted on the second side of the router.

11. A system according to claim 10, wherein the trough body includes a closed side wall opposite the ported side wall, and a back wall extending between the ported and the closed side walls.

12. A system according to claim 11, including a front door that is either mounted or hinged to the trough body opposite the back wall.

13. A system according to claim 10, including one or more cable retention brackets fastened inside the trough body for retaining cables inserted in the trough.

14. A system according to claim 10, including one or more cable tie down brackets fastened inside the trough body for securing cables inserted in the trough in a desired position.

15. A system according to claim 14, wherein one of the cable tie down brackets has one or more associated straps for tying down the inserted cables to the bracket inside the trough.

16. A system according to claim 10, including one or more mounting brackets fixed to the trough body for mounting the trough on a side of the router.

17. A system according to claim 16, wherein the mounting brackets are formed and arranged to mount the trough on a side wall of a router cabinet.

18. A cable trough according to claim 1, including one or more cable bend limiters fastened to the trough body in the vicinity of the first and the second trough cable ports.

* * * * *